US008423352B2

(12) United States Patent
Lai et al.

(10) Patent No.: US 8,423,352 B2
(45) Date of Patent: Apr. 16, 2013

(54) ENHANCING LANGUAGE DETECTION IN SHORT COMMUNICATIONS

(75) Inventors: QingZhang Lai, Austin, TX (US); Ann Marie Grizzaffi Maynard, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/754,759

(22) Filed: Apr. 6, 2010

(65) Prior Publication Data

US 2011/0246180 A1    Oct. 6, 2011

(51) Int. Cl.
*G06F 17/27*    (2006.01)
(52) U.S. Cl.
USPC .................................. 704/9; 704/8; 704/257
(58) Field of Classification Search ................ 704/1–10, 704/277, 251, 255, 257, 110
See application file for complete search history.

(56) References Cited

U.S. PATENT DOCUMENTS

| | | | |
|---|---|---|---|
| 6,487,533 B2 * | 11/2002 | Hyde-Thomson et al. ... | 704/260 |
| 6,711,542 B2 * | 3/2004 | Theimer ..................... | 704/257 |
| 7,689,409 B2 * | 3/2010 | Heinecke ..................... | 704/9 |
| 2006/0227945 A1 | 10/2006 | Runge et al. | |
| 2008/0126077 A1 | 5/2008 | Thorn | |
| 2011/0071817 A1 * | 3/2011 | Siivola ....................... | 704/8 |

OTHER PUBLICATIONS

Anna V. Zhdanova, "Automatic Identification of European Languages," NLDB '02 Proceedings of the 6th International Conference on Applications of Natural Language to Information Systems—Revised Papers, pp. 76-84.*
Carter S., Tsagkias M., Weerkamp W., "Semi-Supervised Priors for Microblog Language Identification," Dutch-Belgian Information Retrieval workshop (DIR 2011).*
Charles M. Kastner, et al. "HAIL: A Hardware-Accelerated Algorithm for Language Identification", 15th Annual Conference on Field Programmable Logic and Applications, Aug. 2005.

* cited by examiner

*Primary Examiner* — Huyen X. Vo
(74) *Attorney, Agent, or Firm* — Garg Law Firm, PLLC; Rakesh Garg; Eusthus D. Nelson

(57) ABSTRACT

A method, system, and computer usable program product for enhancing language detection in short communications are provided in the illustrative embodiments. A short communication is stored in an element of a line cache. The line cache is accessible to an application executing in a data processing system. The element is an element in a set of elements in the line cache. A compound text is assembled from contents of a subset of the elements of the line cache. A language identifier (language ID) is received for the compound text from a language detection algorithm. The language ID is stored in a language cache element of a language ID cache. The language ID cache is accessible to the application and includes a set of language cache elements. A language of the short communication is determined using the contents of a subset of language cache elements.

20 Claims, 8 Drawing Sheets

ENHANCING LANGUAGE DETECTION IN SHORT COMMUNICATIONS

BACKGROUND OF THE INVENTION

1. Field of the Invention

The present invention relates generally to an improved data processing system, and in particular, to a computer implemented method for determining a language used in a communication. Still more particularly, the present invention relates to a computer implemented method, system, and computer usable program code for enhancing language detection in short communications.

2. Description of the Related Art

As the pace of communication accelerates, today's mobile, global workforce needs instant access to people and information to be successful in their business. This globalized business landscape makes for a complex work environment considering that a significant fraction of world's population needs or prefers a language other than English for business.

Communication tools, such as chat, text, and instant messaging technology, are often employed for quick short communications. Some applications used for similar purposes allow a user to set a language of the other party to the conversation and perform a translation from that language to the user's preferred language.

For example, some of these applications may provide a language drop down selector for selecting a receiving-user-determined language of an incoming message. Such applications may then perform a translation of the incoming message from the language of the incoming message to the preferred language of the receiving user.

SUMMARY OF THE INVENTION

The illustrative embodiments provide a method, system, and computer usable program product for enhancing language detection in short communications. An embodiment stores a short communication in an element of a line cache. The line cache is accessible to an application executing in a data processing system. The element is an element in a set of elements in the line cache. The embodiment assembles a compound text from contents of a subset of the elements of the line cache. The embodiment receives a language identifier (language ID) for the compound text from a language detection algorithm. The embodiment stores the language ID in a language cache element of a language ID cache. The language ID cache is accessible to the application. The language ID cache includes a set of language cache elements. The embodiment determines a language of the short communication using the contents of a subset of language cache elements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
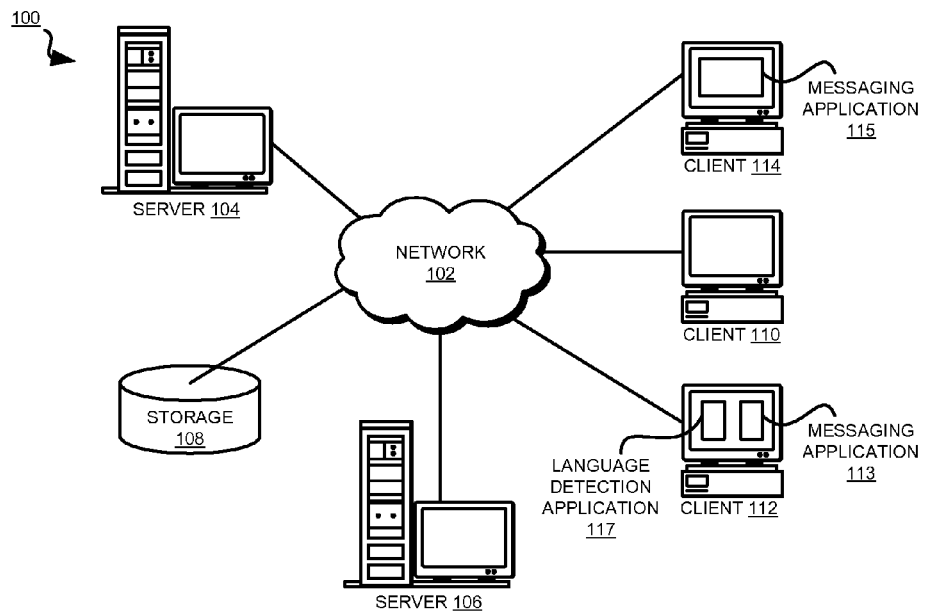
FIG. 1 depicts a pictorial representation of a network of data processing systems in which illustrative embodiments may be implemented.

In the existing applications that perform language translation of incoming messages, the invention recognizes that the language of the incoming message must be known a priori. In other words, the receiving user has to know what the language of the incoming message is, or is likely to be, to set the language of the incoming message. Only then, the existing applications can perform the desired translation from that language to the language of the receiving user.

The a priori setting of a language of a sending-user is not always possible or desirable. For example, a call center representative may receive a chat message from a previously unknown person. Because the person sending the chat message is previously unknown, a priori setting of the language of the person is not possible. Accordingly, the chat application cannot perform the translation of the chat message.

Automatic language detection algorithms presently exist. However, the invention recognizes that an existing language detection algorithm is successful only when a well-formed text of a threshold length is provided to the algorithm for analysis. A threshold length of the text may be a number of characters, words, phrases, or character combinations. A well-formed text is text that is constructed according to the grammar and standards of a language of the text.

A well-known algorithm for language detection uses character trigrams in a text to identify a language. The theory behind this algorithm is that letter combinations are characteristics indicative of a language. The language of a body of text can be determined by comparing the frequency of three-character sequences (trigrams) from the text to known trigrams of a variety of languages. If the body of text is well-written and at least of threshold length, the algorithm may generate sufficient characteristic trigrams for detecting the language of the text with acceptable accuracy.

A short communication according to the invention is text that is shorter in length than the threshold length of text needed for a language detection algorithm. Further, a short communication may not be well-formed. For example, the short communication may include non-standard abbreviations, colloquialisms, typographical errors, proprietary words or symbols, alternative or non-standard representation of phonetic characteristics of a language, or a combination thereof. Furthermore, a short communication according to the invention may be textual representation, such as subtitles, of a voice conversation.

For example, the word "hii" may be a one-word short communication containing a typographical error. "How r u" may be another example of a multi-word short communication containing non-standard abbreviations.

The invention recognizes that existing applications for short communications and language detection algorithms are each ineffective for automatically detecting a language of a short communication. Even when an attempt is made to use a combination of the existing applications and language detection algorithms for detecting the language of short communications, the combination fails to detect the language at or above a threshold confidence level, if not fail completely.

Confidence level, or confidence, in a language prediction is a degree of reliability that can be imparted to the predicted language. For example, a language detection algorithm may predict that the language of a given text is Caribbean Spanish with ten percent confidence. In other words, a ten percent confidence in a language prediction suggests that there is a ninety percent possibility that this language prediction is wrong.

The illustrative embodiments used to describe the invention generally address and solve the above-described problems and other problems related to language detection in short communications. The illustrative embodiments provide a method, computer usable program product, and data processing system for enhancing language detection in short communications.

According to an embodiment of the invention, short communication may be artificially lengthened to a threshold length to allow a language detection algorithm to determine the language of the short communication. According to another embodiment, a mid-conversation change in the language of the short communication may also be detected.

For example, a multilingual sending-user may switch languages or use a combination of two or more languages in a conversation. As another example, more than one sending users may simultaneously converse with a receiving user. Each sending-user may join the conversation different times and may use a different language. An embodiment of the invention may detect the presence of multiple languages in a conversation comprising a set of short communications. A set of short communications is one or more short communications. An embodiment may also detect a change in a language of the conversation.

An embodiment may allow detecting multiple languages in a short communication with improved confidence as compared to the confidence achieved using the presently possible language detection algorithms. Furthermore, an embodiment may allow language detection in short communications of any form as long as the form of communication is convertible to text.

The illustrative embodiments are described with respect to certain data, data structures, file systems, fine names, directories, and paths only as examples. Such descriptions are not intended to be limiting on the invention. For example, an illustrative embodiment described with respect to textual short communication in an instant message may be implemented with respect to audio dialogues in a video clip within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application may further include data objects, code objects, encapsulated instructions, application fragments, services, and other types of resources available in a data processing environment. For example, Java® object, an Enterprise Java Bean (EJB®), a servlet, or an applet may be manifestations of an application with respect to which the invention may be implemented. (Java, EJB, and other Java related terminologies are registered trademarks of Sun Microsystems, Inc. in the United States and other countries.)

An illustrative embodiment may be implemented in hardware, software, or a combination thereof. An illustrative embodiment may further be implemented with respect to any type of short communication in any combination of one or more languages or dialects.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular software tools and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
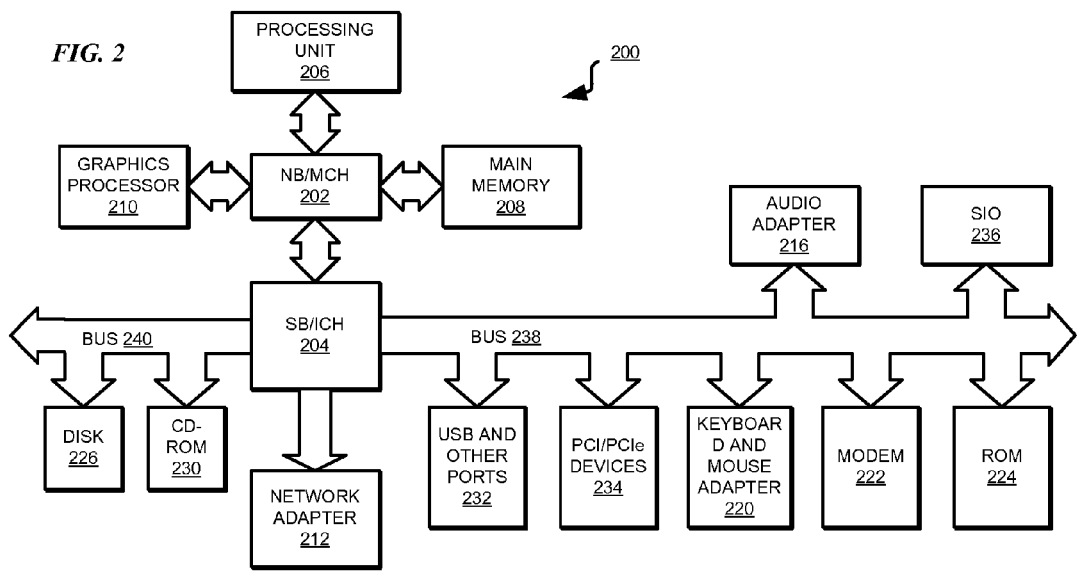
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Client 112 may include application 113. Client 114 may include application 115. Applications 113 and 115 may be examples of applications usable for short communications. For example, applications 113 and 115 may each be a same or different messaging applications, such as instant messaging (IM) clients, chat applications or applets, or short message service (SMS) tools. Client 112 may further include language detection application 117. Language detection application 117 may utilize any language detection algorithm without limitation.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
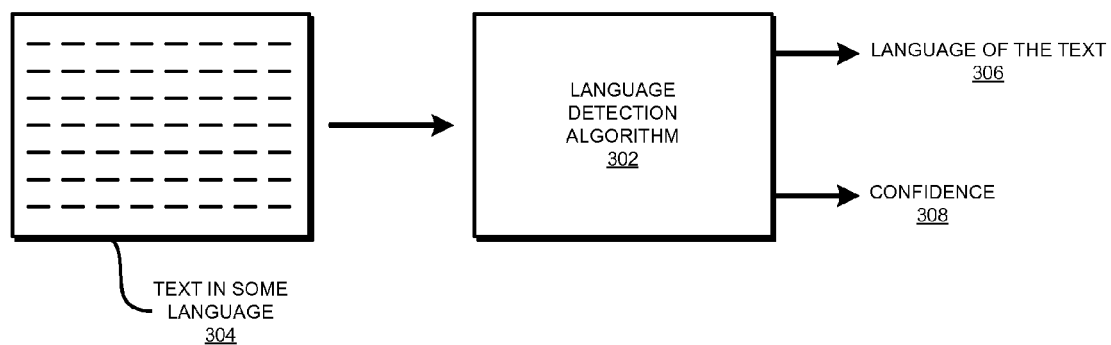
FIG. 3 depicts a block diagram of a problem in language detection with respect to which an illustrative embodiment may be implemented.

With reference to FIG. 3, this figure depicts a block diagram of a problem in language detection with respect to which an illustrative embodiment may be implemented. Language detection algorithm 302 may be any language detection algorithm, such as an algorithm implemented in language detection application 117 in FIG. 1.

Presently, algorithm 302 receives text 304 as input. Algorithm 302 may output language 306 of the text and confidence 308 in the prediction of language 306.

Text 304 has to be a well-formed text of at least a threshold length. For example, text 304 may be a text portion of a formal email communication, a paragraph of a letter, a page of a book, or any other similar portion of a well-formed text. As the invention recognizes, short communications may not include text in the form of text 304.

Figure 4:
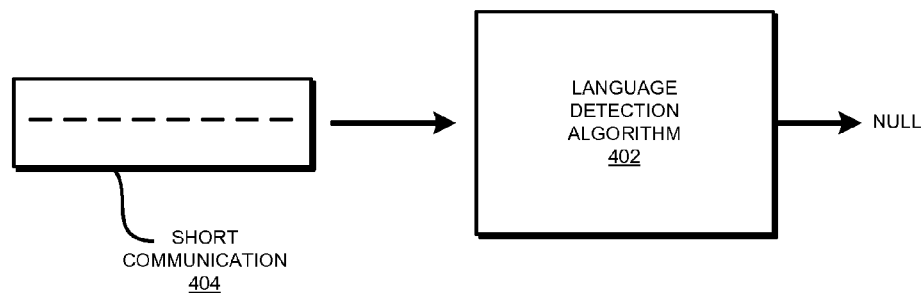
FIG. 4 depicts a block diagram of a problem in language detection with respect to which an illustrative embodiment may be implemented.

With reference to FIG. 4, this figure depicts a block diagram of a problem in language detection with respect to which an illustrative embodiment may be implemented. Language detection algorithm 402 may be similar to language detection algorithm 302 in FIG. 3.

Presently, if short communication 404 is provided as an input to language detection algorithm 402, language detection algorithm 402 may not be able to detect a language of short communication 404. Some implementations of language detection algorithm 402 may output NULL value for the language of short communication 404. Other implementations of language detection algorithm 402 may output a language but with a confidence value that may not be acceptable.

Figure 5:
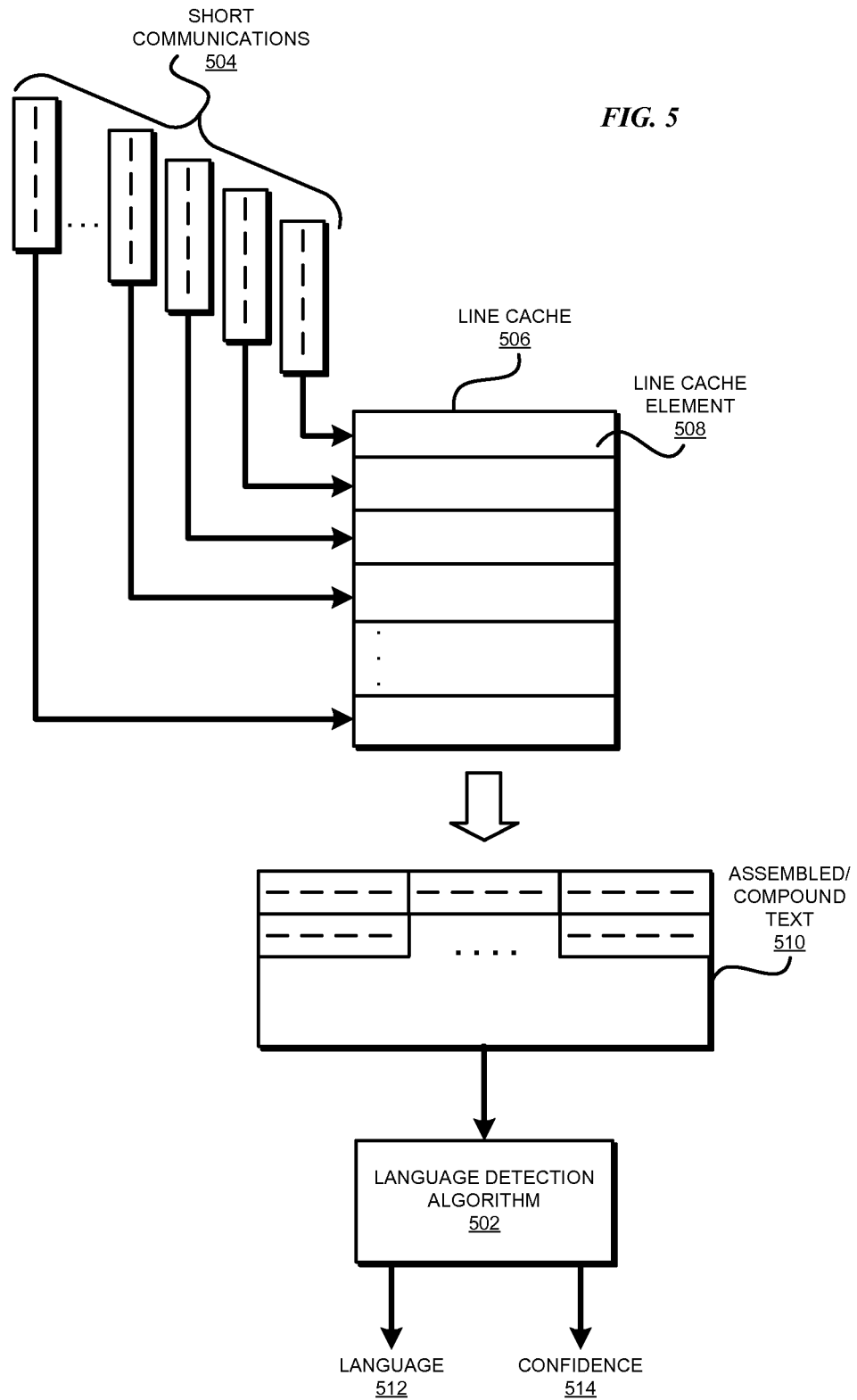
FIG. 5 depicts a block diagram of an example configuration for enhancing language detection in short communications in accordance with an illustrative embodiment.

With reference to FIG. 5, this figure depicts a block diagram of an example configuration for enhancing language detection in short communications in accordance with an illustrative embodiment. Language detection algorithm 502 may be similar to language detection algorithm 402 in FIG. 4.

Set 504 may be a set of short communications similar to short communication 404 in FIG. 4. Line cache 506 may be a data structure of any suitable type, configured to store some or all short communications from set 504. Furthermore, line cache 506 may be created and manipulated in any type of data storage device without limitation.

Line cache 506 may include any number of line cache elements similar to line cache element 508. Line cache element 508 may be a data storage space suitably configured to hold one short communication. In some instances, line cache element 508 may be configured to hold multiple short communications, such as for example, two separate single word communications concatenated together. Line cache 506 may be included in or accessible to a short communications application, such as messaging applications 113 and 115 in FIG. 1.

Line cache elements 508 in line cache 506 may be populated with short communications from set 504 as they are received in the short communications application. The contents of line cache elements 508 are assembled, concatenated, mixed, or otherwise combined to form assembled text 510. Assembled text 510 is also referred to as compound text 510.

Compound text 510 is provided as an input to language detection algorithm 502. Language detection algorithm 502 outputs language 512 as the language detected in compound text 510. Language detection algorithm 502 may also output confidence level 514 indicative of the reliability of detected language 512.

In operation, many alternative factors may be considered in populating line cache 506. For example, in one embodiment, each short communication in set 504, regardless of the contents, context, relevance, size, or another attribute of the short communication, may be placed in one line cache element 508. In another embodiment, a selection criterion may be employed determine whether a particular short communication in set 504 may be stored in line cache 506. For example, a short communication may include only "D" or ":D" used to indicate an emoticon. A selection criterion may determine that single letter short communications may not be particularly helpful in detecting the language of the short communication. Accordingly, some short communications in set 504 may be admitted to line cache 506 and others may not.

Similarly, many alternative factors may be considered in determining how many line cache elements 508 should be used in line cache 506. For example, one embodiment may require that the language of the short communication has to be detected with at least a threshold level of confidence. For example, the embodiment may set the threshold level of confidence to one hundred percent, requiring absolute confidence in the detection.

As another example, another embodiment may require that the computational cost of language detection cannot degrade the system performance by more than a threshold amount. Accordingly, the number of short communications collected in line cache 506 may have to be adjusted.

In certain circumstances, increasing the number of line cache elements 508 may collect more short communications and enable creating larger compound text 510, causing improved confidence in the language detection by language detection algorithm 502. In certain other circumstances, increasing the number of line cache elements 508 may not yield increasingly better language detection confidence after a certain confidence level is reached. In some cases, the number of line cache elements 508 may be tuned to achieve a certain level of confidence in the language detection while keeping the computational cost of performing the detection within a certain limit.

Similarly, many alternative factors may be considered in creating compound text 510 from the contents of line cache elements 508. For example, in one embodiment, the length of compound text 510 may be set at the threshold length for a given language detection algorithm 502. In another embodiment, the length of compound text 510 may be variable at or above the threshold length.

For example, the variability on the length may be a factor of the suspected or expected language of the short communication. Some languages may require longer than threshold length of compound text 510 to make a reliable language prediction. As another example, the variability on the length may be a factor of the sending-user's identity. Some users may write using more acronyms or abbreviations than other users, requiring longer compound text 510 for a reliable language prediction.

In another embodiment, in each iteration of language detection process, all short communications being combined to form compound text 510 may have to be new or not previously detected in a given conversation. In another embodiment, in each iteration of language detection process, some short communications being combined to form compound text 510 may repeat from a previous iteration's compound text 510.

Figure 6:
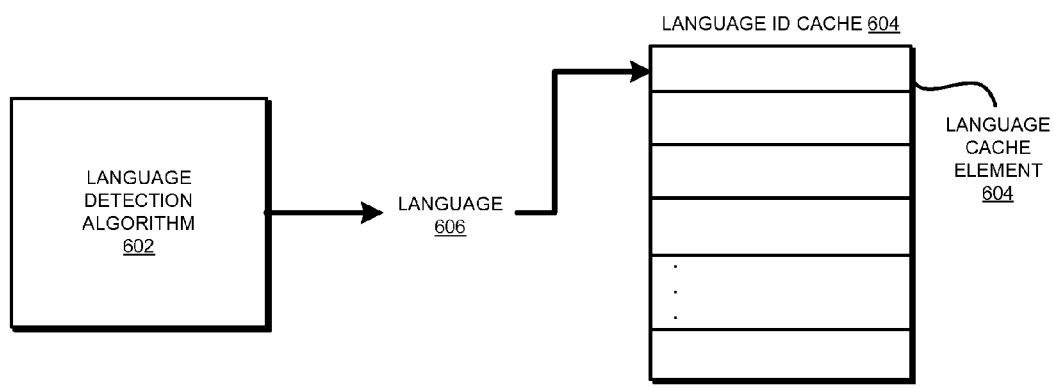
FIG. 6 depicts a block diagram of another example configuration usable in enhancing language detection in short communications.

With reference to FIG. 6, this figure depicts a block diagram of another example configuration usable in enhancing language detection in short communications. Language detection algorithm 602 may be similar to language detection algorithm 502 in FIG. 5.

Language identifier cache (language ID cache) 604 may be a data structure of any suitable type, configured to store language output 606 of language detection algorithm 602. Language output 606 may be similar to language 512 in FIG. 5. Furthermore, language ID cache 604 may be created and manipulated in any type of data storage device without limitation.

Language ID cache 604 may include any number of language cache elements similar to language cache element 608. Language cache element 608 may be a data storage space suitably configured to hold one language identifier of any type. For example, in one embodiment, the language identifier may be a two-letter alphanumeric code. In another embodiment, a language identifier may be one or more words in the full name of the language or dialect.

Language ID cache 606 may be included in or accessible to a short communications application, such as messaging applications 113 and 115 in FIG. 1. Additionally, language ID cache 606 may be usable by the short communication application in conjunction with a line cache, such as line cache 506 in FIG. 5.

Figure 7:
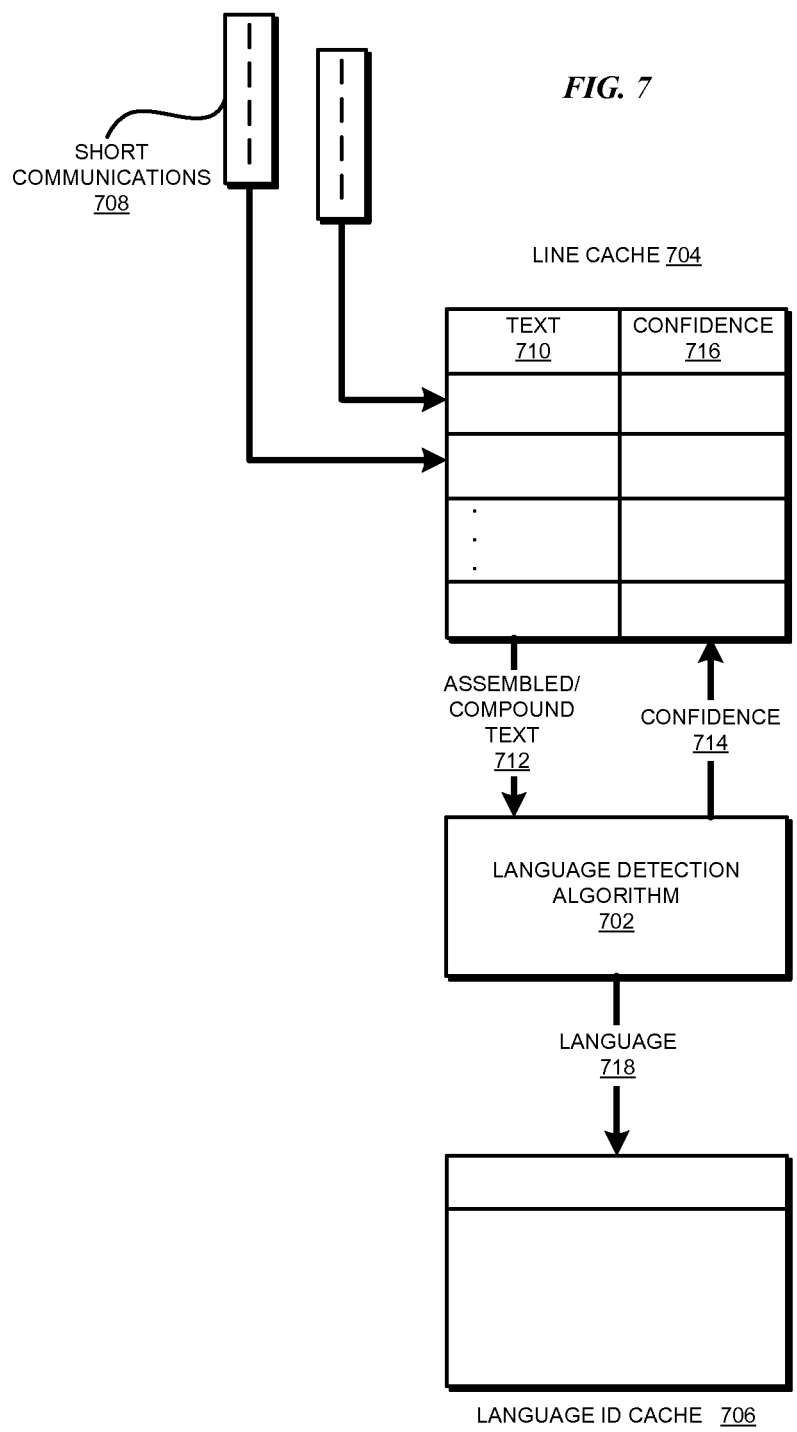
FIG. 7 depicts a block diagram of an example operation of a configuration for enhancing language detection in short communications in accordance with an illustrative embodiment.

With reference to FIG. 7, this figure depicts a block diagram of an example operation of a configuration for enhancing language detection in short communications in accordance with an illustrative embodiment. Language detection algorithm 702 may be similar to language detection algorithm 602 in FIG. 6. Line cache 604 may be similar to line cache 506 in FIG. 5 with certain modifications as described here. Language ID cache 706 may be similar to language ID cache 604 in FIG. 6. Short communications 708 may be all or a subset of set 504 in FIG. 5.

Line cache 704 may be configured to include additional data. For example, line cache 704 may be configured to store a confidence value corresponding to each short communication stored in a line cache element. Line cache elements may be stored under column 710 labeled "text". Confidence level 714 returned by language detection algorithm 702 for compound text 712 that includes the contents of a particular line cache element may be stored in the same row as the line cache element, under column 716 labeled "Confidence". Language 718 of compound text 712 may be stored in an element of language ID cache 706.

Such an alternate configuration of line cache 704 may be usable for selectively discarding those short communications that have a corresponding confidence level below a threshold level. The discarded short communications free up line cache elements in line cache 704 to store new short communications. The new short communications can then be used for constructing new or different compound text 712 that may improve the confidence level in the language detection for the entire conversation.

In operation, language ID cache 706 will accumulate language IDs in language cache elements. Not all language cache elements may contain the same language ID. For example, in one iteration of language detection with one instance of compound text 712, language detection algorithm may predict that the language is likely to be Spanish (Mexico), with a confidence of fifty percent. In another iteration of language detection with another instance of compound text 712, language detection algorithm may predict that the language is likely to be Spanish (Caribbean) with a confidence of sixty percent. In a third iteration, language detection algorithm may predict that the language is likely to be a dialect of English and Spanish mixed, with a confidence of thirty percent.

During the course of operation, with a few iterations and a few instances of compound text 712, language ID cache 706 may settle into a state where the contents of a threshold proportion of the used language cache elements are identical. For example, after a period of operation, four language cache elements out of seven may contain the language ID "Spanish (Caribbean)" with and three elements may be unused. Thus, "Spanish (Caribbean) may be detected as the language of the conversation.

In another example, five out of seven language cache elements may contain "Spanish (Caribbean)", and two may contain "Spanish (Mexico)". A threshold may be that a language is considered detected when more than half of the language cache elements contain the same value. Thus, "Spanish (Caribbean) may be detected as the language of the conversation.

As a further enhancement, in this example, the two elements with "Spanish (Mexico)" values may be cleared. Some iterations of operation may be executed again with different compound text 712. Language detected in the new iterations may be stored in the cleared language cache elements of language ID cache 706. Such an embodiment may enhance the confidence level in the language detected.

Figure 8:
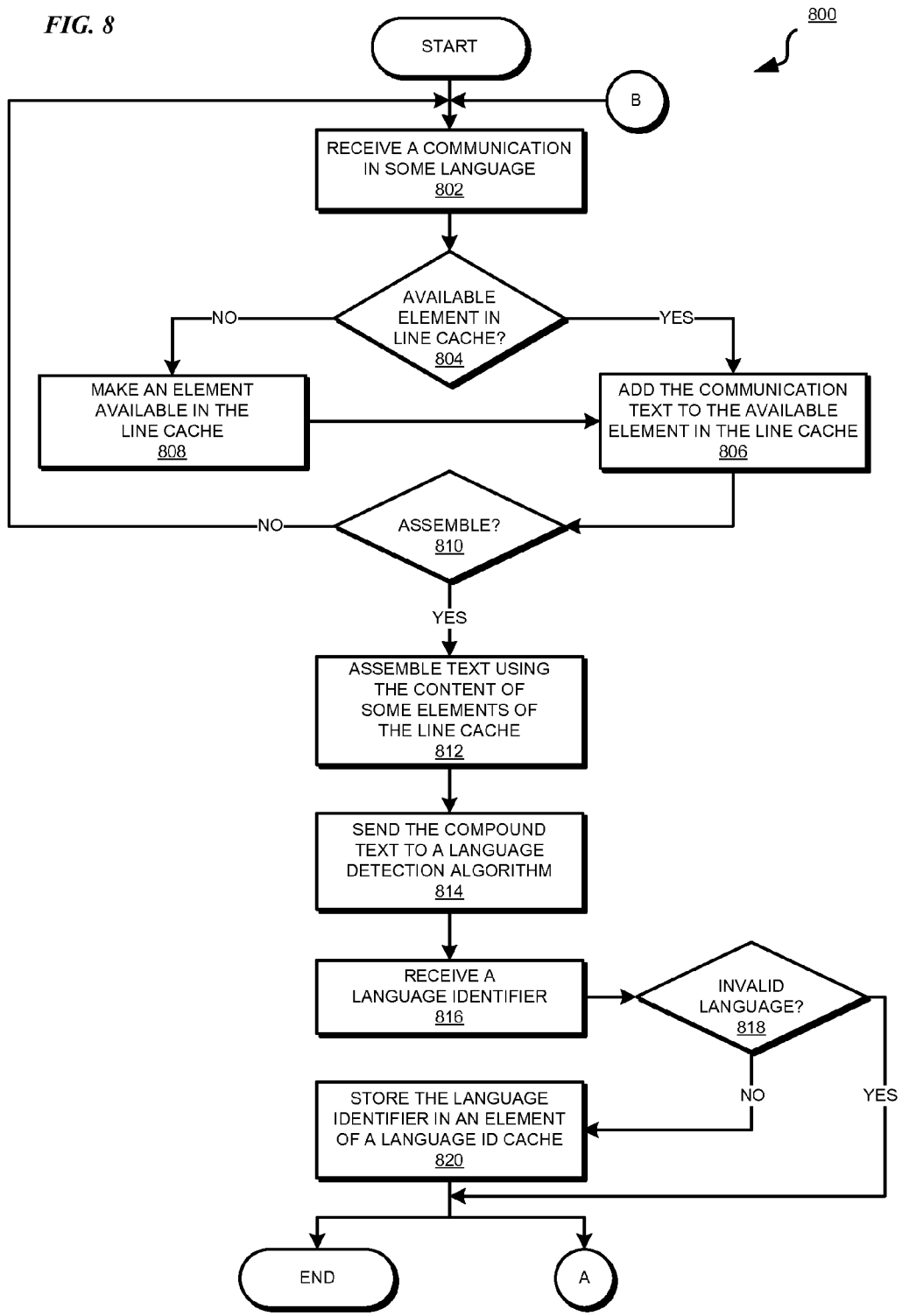
FIG. 8 depicts a flowchart of a process of enhancing language detection in short communications in accordance with an illustrative embodiment.

With reference to FIG. 8, this figure depicts a flowchart of a process of enhancing language detection in short communications in accordance with an illustrative embodiment. Process 800 may be implemented in conjunction with a line cache, such as line cache 506 in FIG. 5 or 704 in FIG. 7. Process 800 may further be implemented in conjunction with a language ID cache, such as language ID cache 604 in FIG. 5 or 706 in FIG. 7. Process 800 may further be implemented in conjunction with any existing language detection algorithm. Process 800 may further be implemented in conjunction with a short communications application, such as messaging applications 113 and 115 in FIG. 1.

Process 800 begins by receiving a communication in some language (step 802). The communication received in step 802 may be a short communication. Another process in this disclosure may enter process 800 at the entry point marked "B".

Process 800 determines whether a line cache element is available to store the communication of step 802 (step 804). If a line cache element is available ("Yes" path of step 804), process 800 stores the communication in the available space (step 806).

If a line cache element is not available ("No" path of step 804), process 800 may make space available in the line cache (step 808). Process 800 may then proceed to step 806. If process 800 is unsuccessful in making space available process 800 may end or take an action suitable according to a particular implementation (not shown).

Process 800 determines whether to assemble the contents of some or all line cache elements (step 810). An implementation may configure any trigger, event, or condition in process 800 to begin the assembly of a compound text using the contents.

If process 800 determines not to assemble the contents into a compound text ("No" path of step 810), process 800 returns to step 802. Process 800 may not assemble a compound text from the contents of the line cache elements, for example, when the contents are not sufficient to assemble a compound text of desired length.

If process 800 determines that compound text should be assembled ("Yes" path of step 810), process 800 assembles the compound text (step 812). For example, process 800 may assemble the compound text using the contents of a subset of a set of line cache elements.

Process 800 sends the compound text to a language detection algorithm (step 814). Process 800 receives a language ID from the language detection algorithm (step 816).

Process 800 determines whether the language ID is invalid (step 818). For example, even with a compound text of sufficient length, a language detection algorithm may not be able to detect a language and return a NULL value.

If process 800 determines that the language ID is a valid value ("No" path of step 818), process 800 proceeds to step 820. Process 800 stores the language ID in an element of a language ID cache (step 820). Process 800 may end thereafter. Alternatively, process 800 may exit at exit point marked "A" and proceed to an entry point marked "A" in another process of this disclosure. Process 800 may similarly exit at exit point "A" or end, if process 800 determines that the language ID is not a valid value ("Yes" path of step 818).

Figure 9:
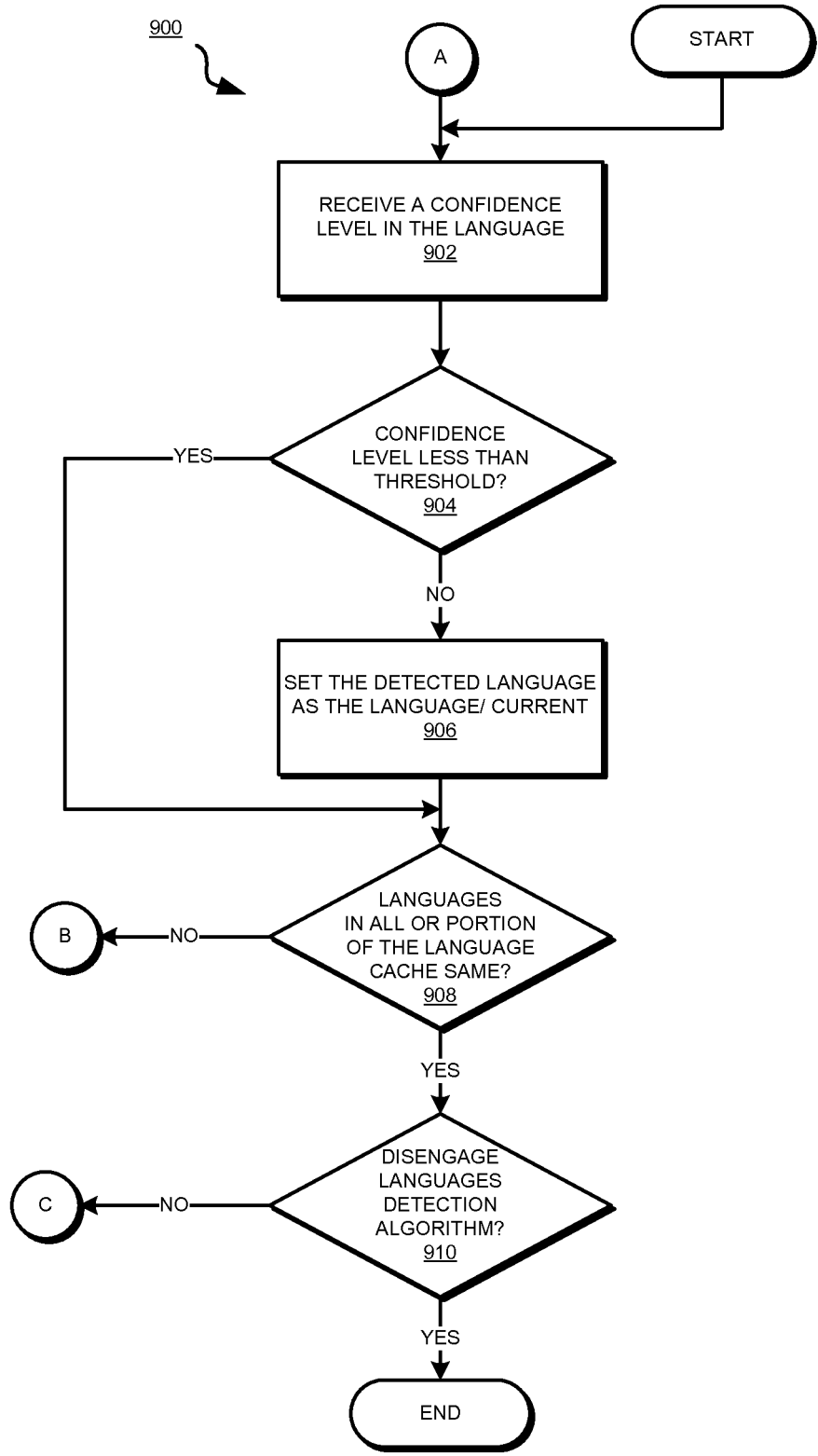
FIG. 9 depicts a flowchart of a process of detecting a language of a short communication in accordance with an illustrative embodiment.

With reference to FIG. 9, this figure depicts a flowchart of a process of detecting a language of a short communication in accordance with an illustrative embodiment. Process 900 may be implemented similar to process 800 in FIG. 8.

A process, such as process 800 in FIG. 8, may enter process 900 at entry point marked "A". Process 900 begins by receiving a confidence level in a language detected in a short communication, such as in process 800 (step 902).

Process 900 determines whether the confidence level is less than a threshold level of confidence (step 904). If the level of confidence from step 902 is not less than the threshold ("No" path of step 904), process 900 sets the detected language as the current language of the short communication (step 906). A current language of a short communication is a language detected using the latest compound text where the confidence level in the detected language is at or above the threshold level of confidence. If the level of confidence from step 902 is less than the threshold ("Yes" path of step 904), process 900 skips step 906 and proceeds to step 908.

Process 900 determines whether all or a predetermined subset of language ID cache elements contain identical language IDs (step 908). If all or a predetermined subset of language ID cache elements do not contain identical language IDs ("No" path of step 908), process 900 proceeds to exit point marked "B" and enters another process of this disclosure with a corresponding entry point marked "B".

If all or a predetermined subset of language ID cache elements contain identical language IDs ("Yes" path of step 908), process 900 determines whether to disengage the language detection algorithm (step 910). Process 900 may choose to disengage the language detection algorithm, for example, when a language has been detected with desired accuracy or confidence, and disengaging the algorithm may improve a system's performance. Process 900 may also choose to disengage the language detection algorithm, for example, when a short communication is not expected to include multiple languages, currently or later during the conversation.

If process 900 determines that the language detection algorithm should not be disengaged ("No" path of step 910), process 900 proceeds to exit point marked "C" and enters another process of this disclosure with a corresponding entry point marked "C". If process 900 determines that the language detection algorithm should be disengaged ("Yes" path of step 910), process 900 may end thereafter.

Figure 10:
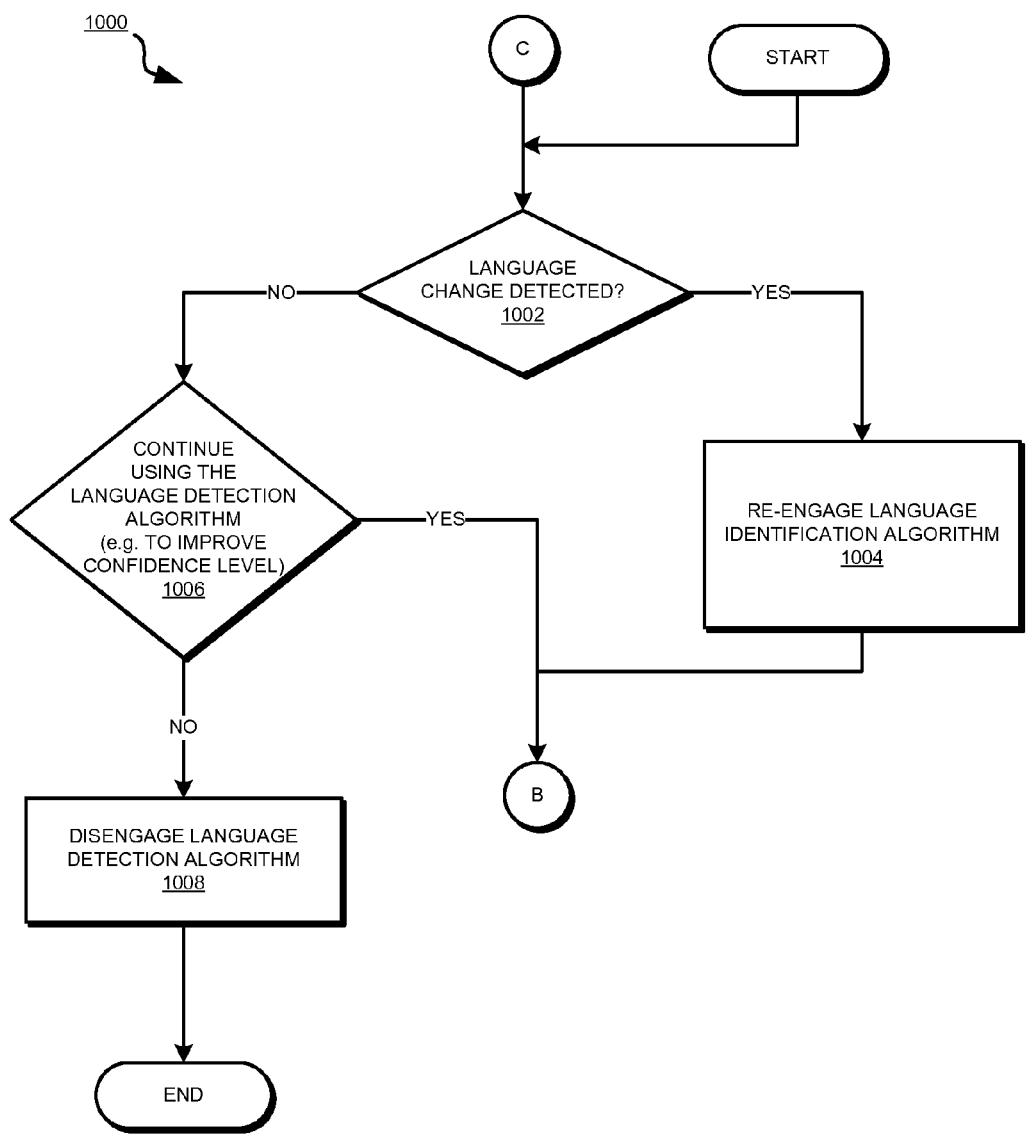
FIG. 10 depicts a process of detecting additional languages in a short communication in accordance with an illustrative embodiment.

With reference to FIG. 10, this figure depicts a process of detecting additional languages in a short communication in accordance with an illustrative embodiment. Process 1000 may be implemented similar to process 800 in FIG. 8 or process 900 in FIG. 9.

A process, such as process 900 in FIG. 9, may enter process 1000 at entry point marked "C". Process 1000 may also begin, such as after a language detection algorithm has been disengaged, determining whether a language change has been detected in a short communication (step 1002).

Process 1000 may include steps for detecting a language change (not shown). Process 1000 may receive an indication of a language change from another source (not shown), such as the short communication application. For example, a third user may join an ongoing instant messaging conversation and the instant messaging application may set off an event representing the joining of the new user. Process 1000 may use that event to understand that the conversation may now include another language.

If process 1000 determines that a language change has been detected or is likely ("Yes" path of step 1002), process 1000 may re-engage the language detection algorithm (step 1004). Process 1000 proceeds to exit point marked "B", and enters another process of this disclosure with a corresponding entry point marked "B".

Process 1000 may also create (not shown) an additional line cache, language ID cache, or both, to detect the additional language. Any number of languages can be detected by creating or reusing a suitable number of line caches, language ID caches, or both. Furthermore, different language detection algorithms may be engaged for detecting different (suspected) languages.

If process 1000 determines that a language change has not been detected or is unlikely in the present conversation ("No" path of step 1002), process 1000 may further determine whether to continue using the language detection algorithm (step 1006). Process 1000 may desire to continue using the language detection algorithm, such as, for example, for improving the confidence level in the detected language.

If process 1000 determines that the language detection algorithm use should continue ("Yes" path of step 1006), process 1000 proceeds to exit point marked "B", and enters another process of this disclosure with a corresponding entry point marked "B".

If process 1000 determines that the language detection algorithm use should not continue ("No" path of step 1006), process 1000 disengages the language detection algorithm (step 1008). Process 1000 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for enhancing language detection in short communications. Using the embodiments of the invention, a language of even a short communication can be determined with improved accuracy. The improved accuracy of language detection allows for improved accuracy in translating short communications into a user's language of choice.

An embodiment can be used to transform a wide variety of collaboration tools and communication systems to enhance automatic language detection. An embodiment may be confiugres to start not from a completely blank language ID cache, but from a primed language ID cache that may include inferences, or language hints. The language hints may come from previous experiences, geographical information about the sending users, data-mining of sending-user's information, and many other sources.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for enhancing language detection in short communications, comprising:
    storing a short communication in an element of a line cache accessible to an application executing in a data processing system, the element being an element in a set of elements in the line cache;
    assembling a compound text from contents of a subset of the elements of the line cache;
    receiving a language identifier (language ID) for the compound text from a language detection algorithm;
    storing the language ID in a language cache element of a language ID cache accessible to the application, the language ID cache including a set of language cache elements; and
    determining, using contents of a subset of language cache elements, a language of the short communication.

2. The computer implemented method of claim 1, further comprising:
    receiving a confidence level from the language detection algorithm;
    storing the confidence level relative to the short communication;
    determining whether the confidence level is at least equal to a threshold confidence level; and
    setting a current language indicator of the short communication to be the language ID responsive to confidence level being at least equal to the threshold confidence level.

3. The computer implemented method of claim 1, wherein the short communication is a set of short communications, further comprising:
    receiving the set of short communications at the application;
    storing the set of short communications using a subset of elements of the line cache;
    determining whether the compound text can be assembled from contents of a second subset of the elements of the line cache;
    assembling, responsive to the determining whether the compound text can be assembled being affirmative, the compound text using a subset of the short communications, the compound text being of a length at least equal to a threshold length of text required by the language detection algorithm for language detection; and
    sending the compound text to the language detection algorithm.

4. The computer implemented method of claim 1, further comprising:
   determining whether the line cache has an available element to store the short communication; and
   responsive to no available elements, clearing a second element in the line cache to store the short communication.

5. The computer implemented method of claim 4, further comprising:
   Storing a confidence level relative to the short communication, wherein the second element in the line cache is the element whose corresponding confidence level is the lowest in the line cache.

6. The computer implemented method of claim 1, wherein determining the language of the short communication further comprises:
   comparing the contents of the subset of language cache elements, and when the contents are identical in each language cache element in the subset of language cache elements, setting that content as the language of the short communication.

7. The computer implemented method of claim 1, wherein using the language detection algorithm is discontinued after determining the language of the short communication, further comprising:
   receiving a second short communication;
   receiving an indication of a language change in the second short communication; and
   re-engaging the language detection algorithm to detect the second language.

8. A computer usable program product comprising a computer usable storage device including computer usable code for enhancing language detection in short communications, the computer usable code comprising:
   computer usable code for storing a short communication in an element of a line cache accessible to an application executing in a data processing system, the element being an element in a set of elements in the line cache;
   computer usable code for assembling a compound text from contents of a subset of the elements of the line cache;
   computer usable code for receiving a language identifier (language ID) for the compound text from a language detection algorithm;
   computer usable code for storing the language ID in a language cache element of a language ID cache accessible to the application, the language ID cache including a set of language cache elements; and
   computer usable code for determining, using contents of a subset of language cache elements, a language of the short communication.

9. The computer usable program product of claim 8, further comprising:
   computer usable code for receiving a confidence level from the language detection algorithm;
   computer usable code for storing the confidence level relative to the short communication;
   computer usable code for determining whether the confidence level is at least equal to a threshold confidence level; and
   computer usable code for setting a current language indicator of the short communication to be the language ID responsive to confidence level being at least equal to the threshold confidence level.

10. The computer usable program product of claim 8, wherein the short communication is a set of short communications, further comprising:
   computer usable code for receiving the set of short communications at the application;
   computer usable code for storing the set of short communications using a subset of elements of the line cache;
   computer usable code for determining whether the compound text can be assembled from contents of a second subset of the elements of the line cache;
   computer usable code for assembling, responsive to the determining whether the compound text can be assembled being affirmative, the compound text using a subset of the short communications, the compound text being of a length at least equal to a threshold length of text required by the language detection algorithm for language detection; and
   computer usable code for sending the compound text to the language detection algorithm.

11. The computer usable program product of claim 8, further comprising:
   computer usable code for determining whether the line cache has an available element to store the short communication; and
   computer usable code for responsive to no available elements, clearing a second element in the line cache to store the short communication.

12. The computer usable program product of claim 11, further comprising:
   computer usable code for storing a confidence level relative to the short communication, wherein the second element in the line cache is the element whose corresponding confidence level is the lowest in the line cache.

13. The computer usable program product of claim 8, wherein determining the language of the short communication further comprises:
   computer usable code for comparing the contents of the subset of language cache elements, and when the contents are identical in each language cache element in the subset of language cache elements, setting that content as the language of the short communication.

14. The computer usable program product of claim 8, wherein using the language detection algorithm is discontinued after determining the language of the short communication, further comprising:
   computer usable code for receiving a second short communication;
   computer usable code for receiving an indication of a language change in the second short communication; and
   computer usable code for re-engaging the language detection algorithm to detect the second language.

15. The computer usable program product of claim 8, wherein the computer usable code is stored in a computer readable storage medium in a data processing system, and wherein the computer usable code is transferred over a network from a remote data processing system.

16. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for enhancing language detection in short communications, the data processing system comprising:
   a storage device including a storage medium, wherein the storage device stores computer usable program code; and a processor, wherein the processor executes the computer usable program code, and wherein the computer usable program code comprises:

computer usable code for storing a short communication in an element of a line cache accessible to an application executing in a data processing system, the element being an element in a set of elements in the line cache;

computer usable code for assembling a compound text from contents of a subset of the elements of the line cache;

computer usable code for receiving a language identifier (language ID) for the compound text from a language detection algorithm;

computer usable code for storing the language ID in a language cache element of a language ID cache accessible to the application, the language ID cache including a set of language cache elements; and computer usable code for determining, using contents of a subset of language cache elements, a language of the short communication.

18. The data processing system of claim 17, further comprising:

computer usable code for receiving a confidence level from the language detection algorithm;

computer usable code for storing the confidence level relative to the short communication;

computer usable code for determining whether the confidence level is at least equal to a threshold confidence level; and computer usable code for setting a current language indicator of the short communication to be the language ID responsive to confidence level being at least equal to the threshold confidence level.

19. The data processing system of claim 17, wherein the short communication is a set of short communications, further comprising:

computer usable code for receiving the set of short communications at the application;

computer usable code for storing the set of short communications using a subset of elements of the line cache;

computer usable code for determining whether the compound text can be assembled from contents of a second subset of the elements of the line cache;

computer usable code for assembling, responsive to the determining whether the compound text can be assembled being affirmative, the compound text using a subset of the short communications, the compound text being of a length at least equal to a threshold length of text required by the language detection algorithm for language detection; and computer usable code for sending the compound text to the language detection algorithm.

20. The data processing system of claim 17, further comprising:

computer usable code for determining whether the line cache has an available element to store the short communication; and computer usable code for responsive to no available elements, clearing a second element in the line cache to store the short communication.

\* \* \* \* \*